US006571327B1

(12) United States Patent
Wertheizer et al.

(10) Patent No.: US 6,571,327 B1
(45) Date of Patent: May 27, 2003

(54) NON-ALIGNED DOUBLE WORD ACCESS IN WORD ADDRESSABLE MEMORY

(75) Inventors: Gideon Wertheizer, Even Yehuda (IL); Eran Briman, Kiriat Ono (IL); Eli Ofek, Ramat-Gan (IL); Gil Vinitzky, Hulon (IL)

(73) Assignee: Parthusceva Ltd., Herzlia (IL)

( * ) Notice: Subject to any disclaimer, the term of this patent is extended or adjusted under 35 U.S.C. 154(b) by 0 days.

(21) Appl. No.: 09/379,142

(22) Filed: Aug. 23, 1999

Related U.S. Application Data

(60) Provisional application No. 60/099,028, filed on Sep. 3, 1998.

(51) Int. Cl.[7] .................................................. C06F 12/00
(52) U.S. Cl. ........................ 711/219; 711/220; 711/211; 711/5
(58) Field of Search ..................... 711/112, 5, 202, 711/211, 217, 219, 220

(56) References Cited

U.S. PATENT DOCUMENTS 4,378,591 A * 3/1983 Lemay ........................... 711/3
4,809,161 A * 2/1989 Torii et al. ................... 365/221
5,638,533 A * 6/1997 Law ............................ 711/157
5,680,567 A * 10/1997 Dent ............................ 711/219

\* cited by examiner

Primary Examiner—Matthew Kim
Assistant Examiner—Matthew D. Anderson
(74) Attorney, Agent, or Firm—Eitan, Pearl, Latzer & Cohen Zedek, LLP.

(57) ABSTRACT

An apparatus which generates even addressed words and odd addressed words in a memory. The apparatus consists of a port adapted for receiving an address, one or more even units in operative communication with the port and one or more odd units in operative communication with the port. The even units output an even address and the odd units output and odd address. If the input address is even the even address is equal to the input address and if the input address is odd the even address is spaced from the input address by N addresses, where N is an odd integer. If the input address is odd, the odd address is equal to the input address and if the input address is even, the odd address is spaced from the input address by N addresses.

12 Claims, 9 Drawing Sheets

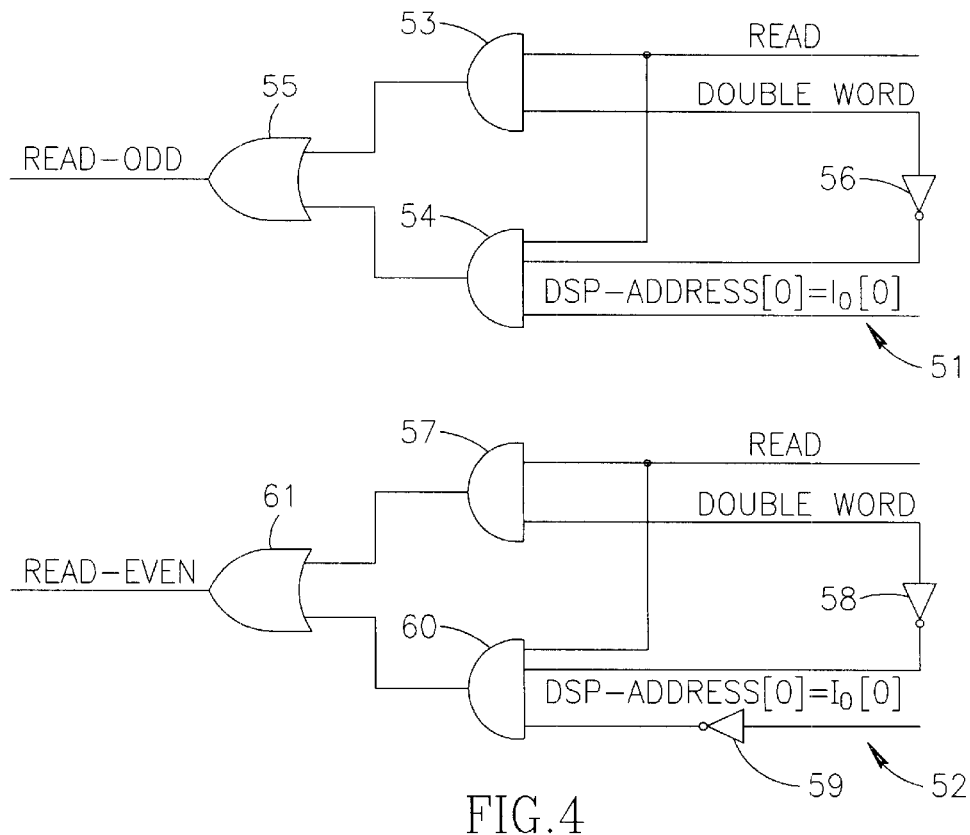
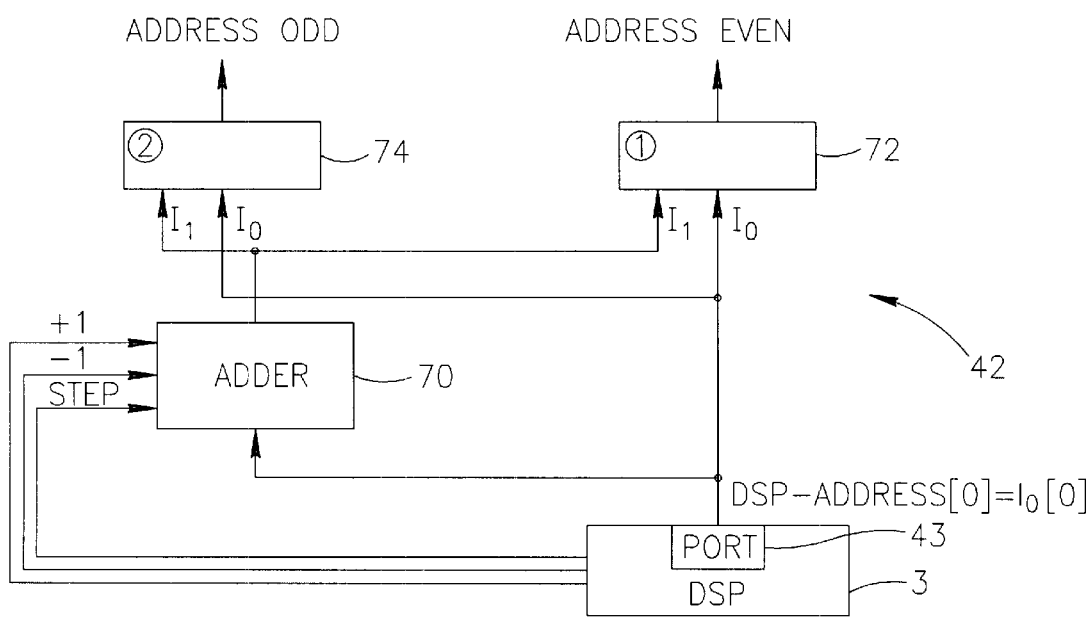
FIG.4
FIG.5

NON-ALIGNED DOUBLE WORD ACCESS IN WORD ADDRESSABLE MEMORY

CROSS REFERENCES TO RELATED APPLICATIONS

This application is related to U.S. Provisional Patent Application Ser. No. 60/099,028 filed on Sep. 3, 1998, incorporated in its entirety by reference herein.

FIELD OF THE INVENTION

The present invention relates to Very Large Scale Circuit Integration (VLSI) circuit memories in general and more particularly to the non-aligned word recall aspects of word addressable memories.

BACKGROUND OF THE INVENTION

Digital Signal Processors (DSP's) consist of a number of components of which the principal unit is a computation unit (CU). The CU consists of a number of sub-units which are capable of performing operations on operands (numbers). Examples of these units include a multiplier (multiplies operands), an arithmetic logic unit (ALU) (adds, subtracts and performs logic operations) and a barrel shifter (BS) (increases or decreases numbers by an order of magnitude).

In order to supply the above-mentioned units of the CU with operands the DSP supplies an address corresponding to a required operand contained within a memory array.

Memories contain many numbers or operands one or more of which may need to be accessible to the CU. More particularly, as is increasingly the case today, when parallel CU's are employed, two or more operands may be required to be supplied simultaneously. For example, one multiplier requires two operands for its operation, whereas two multipliers require four operands. In practice, when two or more operands are required by a CU (or by a number of CU's which are joined together in parallel) at the same time, there is a restriction, due to the way that conventional memories are structured, on where these operands may be drawn from and in which fashion they may be withdrawn from within the memory array. Attempts have been made to overcome these limitations and an example of one such attempt follows. These methods of overcoming the limitations are very expensive due to, amongst other things, the increased area of silicon wafer required. Alternatively, certain memory transactions can be restricted, which affects the overall performance of the DSP.

FIG. 1, which is now referred to herein, shows an example of a standard memory architecture attached to multiple CU's, 1, contained in DSP 3 in accordance with the prior art. Standard memory array 2 is made up of rows 4 and there are a fixed number of word storage areas 6 in each row. The structure is similar to pigeonholes in a post office sorting rack, each pigeonhole or word storage area 6 being designated by an address containing a word 6. The number of words placed in each row is dependent on many factors including memory speed required and area of the memory array required. The exemplary standard memory 2, shown in FIG. 1 has eight memory cells per row.

FIG. 2A which is a flow chart illustration of the steps required to retrieve a word from memory 2 is now referred to herein. In the center of memory 2, there is a row decoder (RDEC), 8. To access memory 2, RDEC 8 selects a row 4 (step 16) in accordance with an address signal sent by DSP 3 (step 14). The selected row 4 is routed to another unit within memory 2 known as a Word Select (WS) decoder 12.

WS decoder 12 comprises a series of "AND" gates 22A–22H. WS decoder 12 selects one word from a selected word storage area 6 (step 18).

Each "AND" gate 22A–22H represents a word on a row 4 of memory array 2 and receives a signal (not shown) from DSP 3, indicating that it should be selected. For example, "AND" gate 22A represents word 6 corresponding to the binary number 000 (0) and gate 22B represents word 6 corresponding to the binary number 001 (1). It should be noted that only the three Least Significant Bits (LSB's) of a DSP address are required in order to differentiate between, for example, eight words 6 on a row 4 of memory array 2, in this particular example. If there were more words per row in memory array 2, more LSB's would be required to differentiate the words. In general, $2^n$ is the size of memory accessible by n bits. Thus a 64K memory requires 16 bits to access it and a 32K memory requires 15 bits.

WS decoder 12 may optionally contain a double word selector 19 which allows the selection of two words in a row 4 in limited circumstances. The double word selection feature which will be described further hereinbelow is an example of an attempt to overcome the limitations of conventional memories as mentioned hereinabove and described further hereinbelow.

The address which is provided by the DSP 3 or any other processor controls the RDEC 8 and WS unit 12. A single address allows only one word from the memory 2 to be selected. In other words, only one RDEC 8 is activated per single address.

As mentioned above, there is often a need to bring two operands (words 6) simultaneously from the memory 2. Utilizing the memory 2 shown in FIG. 1, two distinct cases can be differentiated. The first case is the one in which the two words are in the same row 4 (aligned words) of memory 2 and the second case is the one in which the two words are located in two different rows 4 (non-aligned words) of memory 2, the different rows being opposite to each other (i.e if one is odd the other is even). In the former case, the two aligned words may be selected almost in the same manner as a single word. The selected row (according to one RDEC 8) is routed to the WS decoder 12 area where two words are selected therefrom rather than one. Selection of two non-aligned words is not achievable in a conventional memory array 2, such as that illustrated in FIG. 1, without architectural changes to the memory. For example, the use of a dual port memory facilitates the selection of two non-aligned words. When it is desired to achieve the selection of two words utilizing a conventional memory, a double word selector 19 is installed in WS 12, as mentioned hereinabove. The double word selector 19 is only capable of facilitating the selection of two aligned words and its installation in the memory involves extra expense.

As an example, FIG. 1 includes double word selector 19 which comprises a series of multiplexers (Mux) 20A–20H each connected to the pair of adjacent "AND" gates 22A–22H and to the corresponding "AND" gate of WS 12. Each "AND" gate 22A–22H represents a word on a row 4 of memory array 2. Thus, in the present example, there are eight "AND" gates 22A–22H. Each Mux, apart from the first and last in the row of eight, receives three signals known as a double word minus 1 (DW−1), double word plus one (DW+1) and current signal. These signals from DSP 3 indicate to a Mux whether to accept the signal from the previous adjacent "AND" gate, the current "AND" gate or the adjacent "AND" gate ahead of it. Thus, two aligned words may be simultaneously selected. The first Mux does not accept a DW−1 signal, as there is no "AND" gate previous to it. The last Mux does not accept a DW+1 signal, as there is no "AND" gate after it. This serves to emphasize that it is possible to select only aligned words (on the same row). Further, it is apparent from the structure that only second or double words adjacent to each other are allowed.

Reference is now made to FIG. 2B which is a flow chart illustration of the process of selecting a double word when a double word selector 19 is installed in a standard memory. Similar reference numerals to those in previous figures refer to similar operations and will not be described further.

The operation of FIG. 2B begins with steps 14 and 16 whereby DSP 3 generates an address and row decoder 8 selects a row 4 in memory array 2 as described previously. The Mux corresponding to the selected word then allows that word to be selected (step 18), utilizing the "current" signal from DSP 3 as is the usual case when no double word selector 19 is installed. The "current" signal is required as there are alternatives (not present) available when a double word selector 19 is installed necessitating a positive selection of the current signal.

For FIG. 2B, however, when a "double word" is selected (step 30) DSP 3 sends a DW+1 or a DW−1 signal to Mux 20 according to whether the word below or above the "current" word is selected. Mux 20 is thus instructed to select a double word which is an LSB of +1 or −1 apart from the selected word (step 32).

Multiplexer 20A connects "AND" gates 22A and 22B and if, for example, "AND" gate 22A is selected by DSP 3 utilizing the address supplied by DSP 3 (i.e current command is selected) and the address is accompanied by an instruction to select two words, the second of which has an LSB which is one greater than the selected address (i.e DW+1) then Mux 20A also selects a word 6 corresponding to the binary number 001 (1), which is the next odd word. The same relationship holds for "AND" gates 22B and 22C and Mux 20B, respectively.

Thus, conventional memory arrays have a limited capacity to be modified to generate two aligned words which are consecutive (even and odd numbers) from a single address. Non-aligned transactions, as described hereinabove, are not possible with a conventional memory structure.

Another solution to the problem of obtaining two operands simultaneously is the use of a dual port memory which allows access to the memory through each one of its two ports. In other words, per transaction, two addresses need to be supplied which allow two words to be accessed, with no limitation on their physical locations. The disadvantage of a dual port memory is its large size and cost compared to a single port memory.

SUMMARY OF THE INVENTION

An object of the present invention is to provide double word access in a word-addressable memory which overcomes the limitations and disadvantages of double word access in prior word-addressable memories.

A further object of the present invention is to provide a double word access in a word-addressable memory which facilitates utilization of all rows and words in a word-addressable memory to produce single or pairs of odd and even words.

There is thus provided, in accordance with a preferred embodiment of the present invention, apparatus which generates even addressed words and odd addressed words in a memory. The apparatus consists of a port adapted for receiving an address, one or more even units in operative communication with the port and one or more odd units in operative communication with the port. The even units output an even address and the odd units output an odd address. If the input address is even, the even address is equal to the input address and if the input address is odd the even address is spaced from the input address by N addresses, where N is an odd integer. If the input address is odd, the odd address is equal to the input address and if the input address is even, the odd address is spaced from the input address by N addresses.

There is further provided a word addressable memory apparatus which is made up of an even memory bank for storing even addressed words and a separate odd memory bank for storing odd addressed words. Further, the word addressable memory apparatus has a read/write command generator for generating a read or write command to or from the odd or even memory.

The word addressable memory apparatus further comprises an address generation unit. The address generation unit receives a desired address and generates the next address by N, where N is an odd integer to the desired address. One of the desired and next addresses is odd and the other is even. The address generation unit provides the even address to the even memory bank and the odd address to the odd memory bank. There is further provided a read/write command generator. The read/write command generator generates a read or write command to or from the odd or even memory.

Further, the address generation unit comprises a port adapted for receiving addresses, one or more even units and one or more odd units in operative communication with the port for outputting even and odd addresses respectively. If the input address is even, the even address is equal to the input address and if the input address is odd the even address is spaced from the input address by N addresses, where N is an odd integer. If the input address is odd, the odd address is equal to the input address and if the input address is even the odd address is spaced from the input address by N addresses.

There is further provided a method for generating an odd address and an even address from a single address. In the method a desired address is received, a next address to the desired address is then generated by N, where N is an odd integer. One out of the next and the desired addresses is odd and the other is even. The even address out of the desired address and next address is then provided to an even memory bank and the odd address is provided to an odd memory bank.

BRIEF DESCRIPTION OF THE DRAWINGS

The present invention will be understood and appreciated more fully from the following detailed description taken in conjunction with the appended drawings in which:

FIG. 4 illustrates an exemplary logic layout for the read/write command generator of FIG. 3;

FIG. 5 illustrates the address generation unit configured in accordance with a preferred embodiment of the present invention;

DETAILED DESCRIPTION OF THE PRESENT INVENTION

Figure 3:
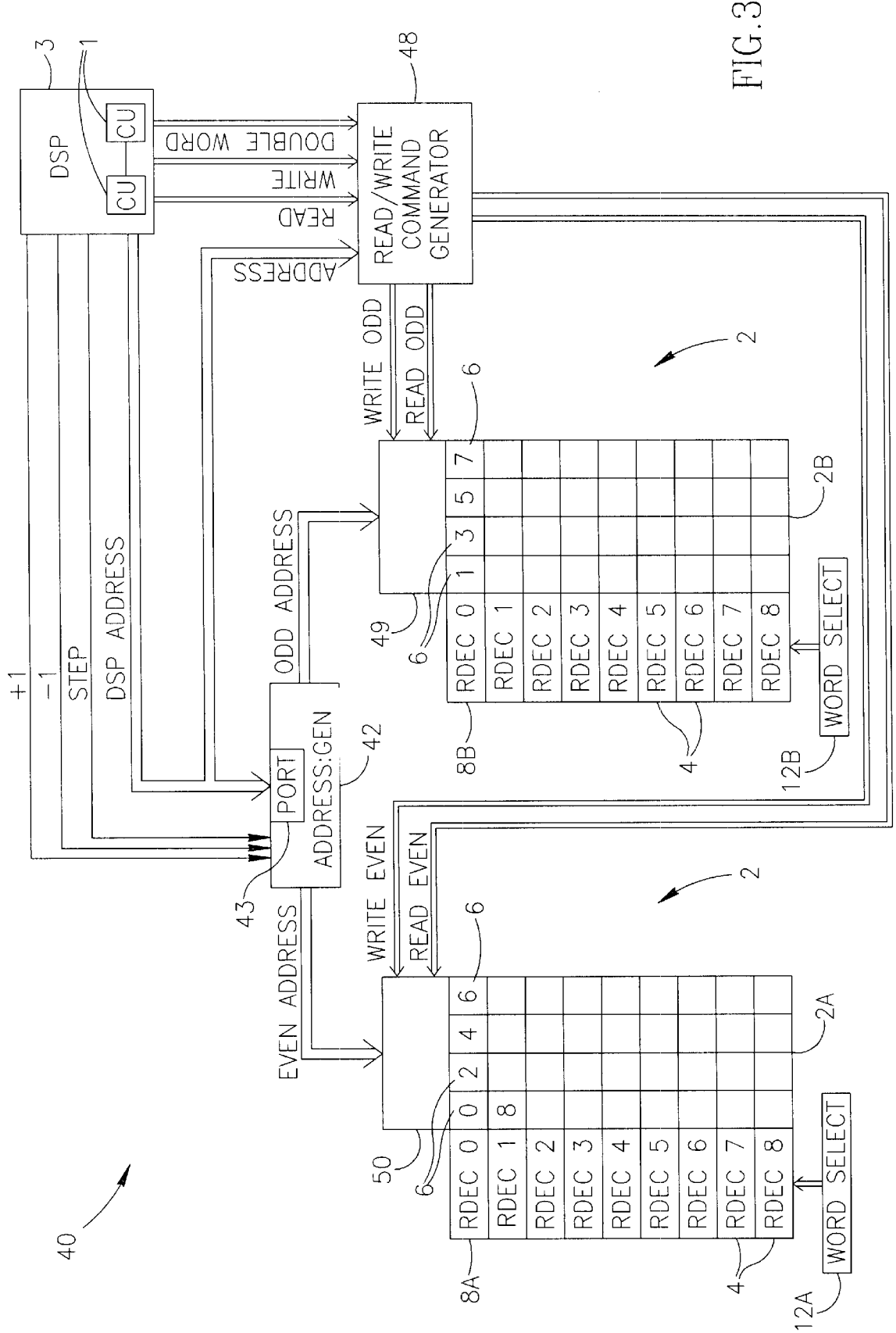
FIG. 3 illustrates a system according to a preferred embodiment of the invention for accessing double words in a single transaction utilizing a conventional memory array.

Reference is now made to FIG. 3 which illustrates a system 40 for accessing double words in a single transaction utilizing a conventional memory array 2 (without a double word selector 19). Similar items to those in previous figures have similar numerals and will not be described further. The system 40 is not restricted to non-aligned or consecutive word transactions since for every single address received, system 40 can generate two addresses and therefore, two RDEC's 8 and memory rows 4 may be activated independently of each other. In accordance with a preferred embodiment of the present invention conventional memory 2 is divided into a two bank memory with one memory 2A (EVEN MEM) storing the odd addresses and one memory 2B (ODD MEM) storing the even addresses. The system 40 thus facilitates the generation of an even and an odd word 6 together, with either or both words 6 originating from any row 4.

Figure 1:
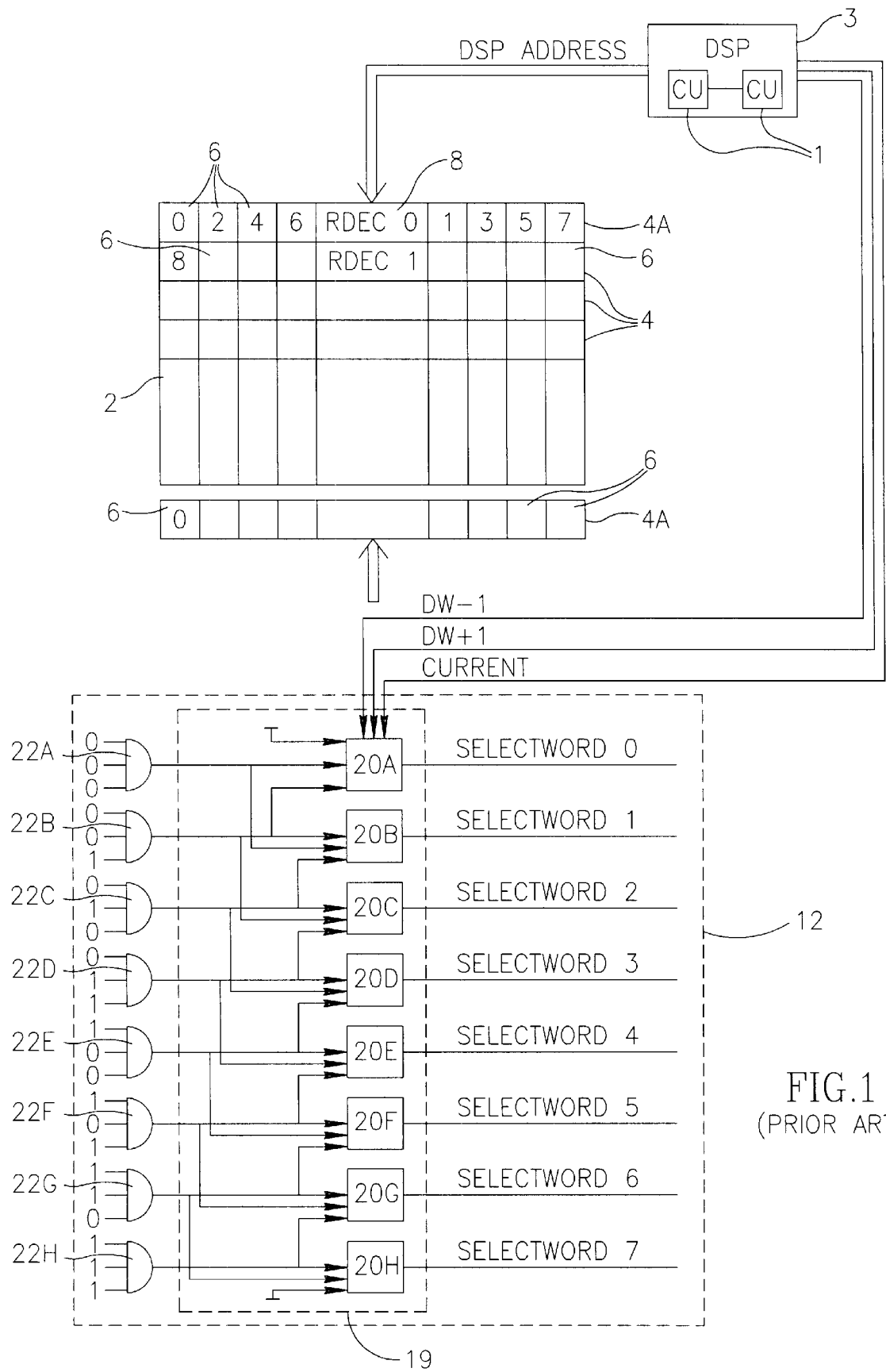
FIG. 1 is a schematic illustration of a prior art word addressable memory configured for both single and double word access.
Figure 2A:
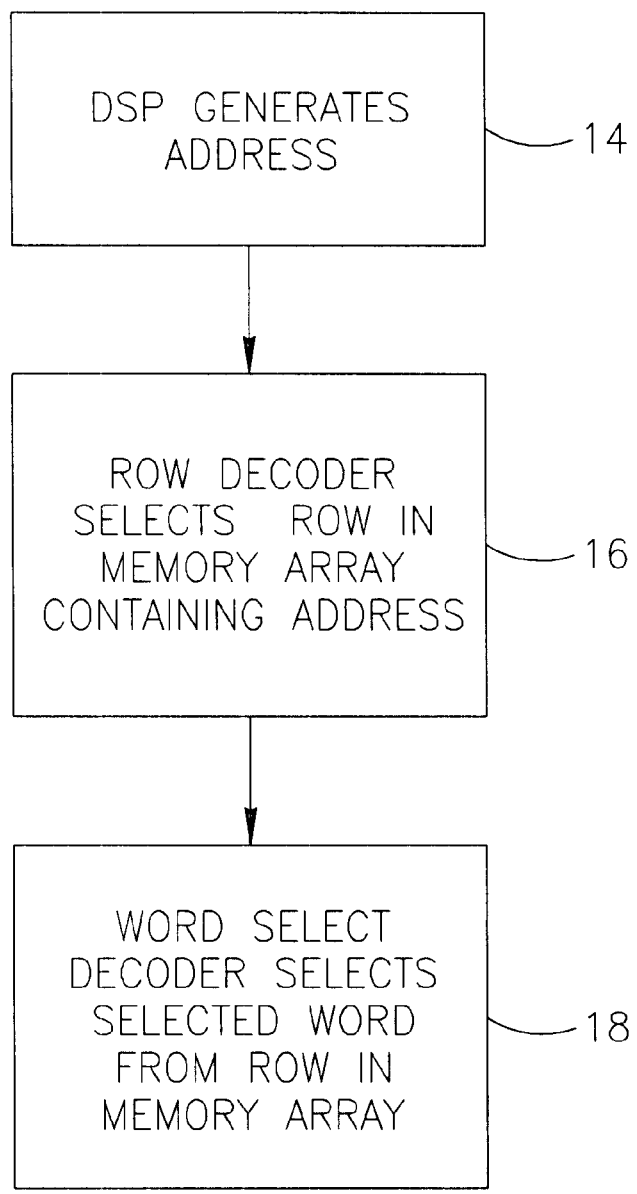
FIG. 2A is a flow chart illustration of the procedure for generating a word in a prior art word-addressable memory from an address supplied by a DSP.
Figure 2B:
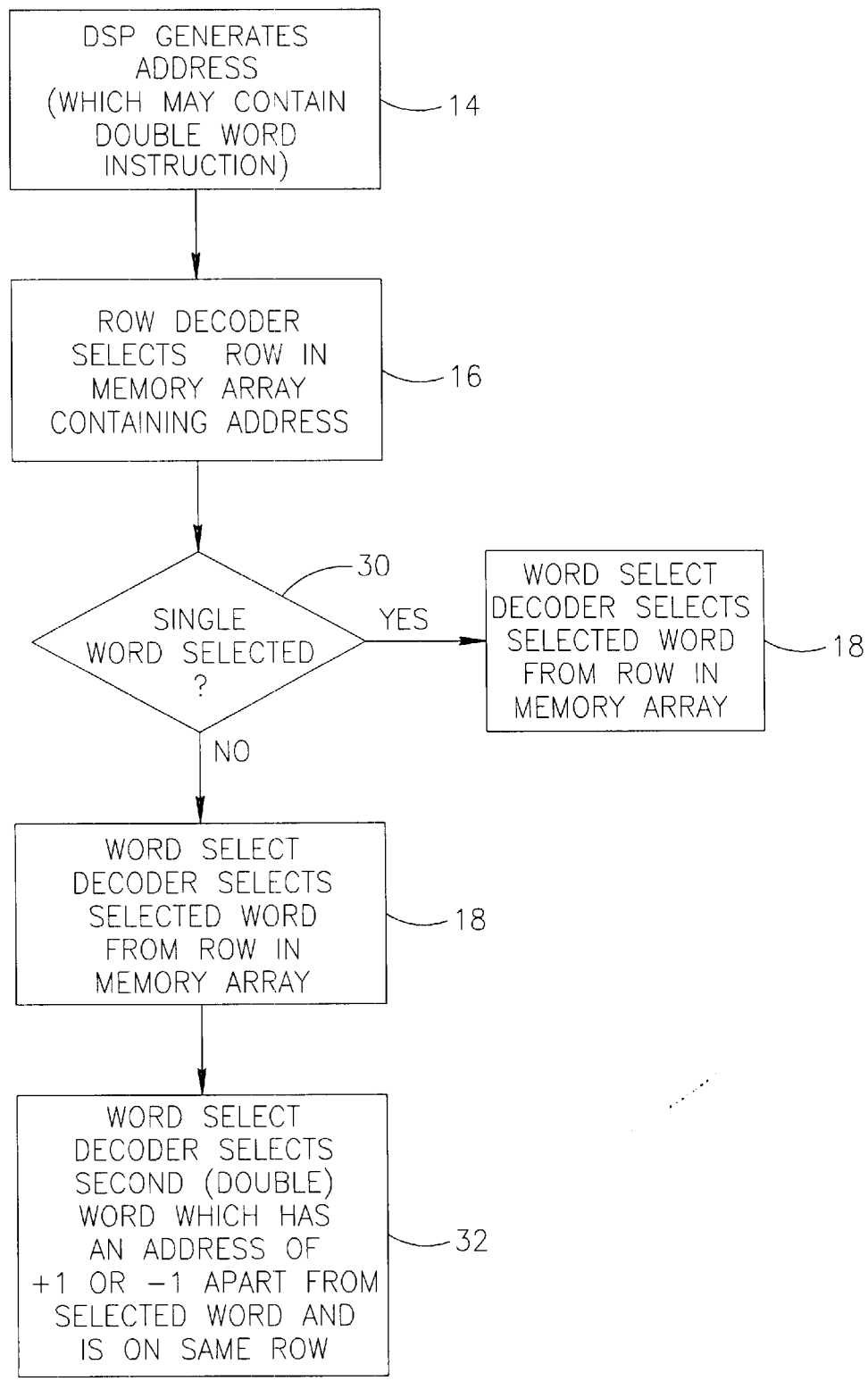
FIG. 2B is a flow chart illustration of the procedure for generating a double word or a single word in a prior art word-addressable memory configured for double word access.

System 40 is comprised of an address generation (ADDRESS_GEN) unit 42 attached to two conventional memory arrays 2A and 2B. Memory array 2A is an even memory for storing even addresses and memory array 2B is an odd memory for storing odd addresses. Thus, it can be said that a conventional memory array 2 (FIG. 1) has been split into two halves (odd and even). Each respective half, memory 2A and 2B has its own RDEC, 8A and 8B respectively and wordselect decoders 12A and 12B respectively. The address generation unit 42 is attached to DSP 3 (or another processor), typically via a port 43. Address generation unit 42 is supplied with an address from DSP 3 as is conventional. Address generation unit 42 may be part of DSP 3 (or another processor) or it may operate in conjunction with DSP 3 (or another processor). The address is odd or even and states whether a double word is required. The address generation unit 42 generates an odd address or an even address according to the address supplied. Address generation unit 42 generates two addresses, always one odd and one even, the second word being the alternative (odd or even) to the address supplied. RDEC 8A and 8B together with wordselect 12A and 12B then select words 6 corresponding to the even address and the odd address respectively, as is conventional.

For example, a memory of 1K (1024) words will be mapped into two banks of memory containing 0.5K (512) words each. The number of bits required to access the divided memory is an order of magnitude less for each half of the divided memory, in accordance with the relation described hereinabove (i.e $2^n$ is the size of memory accessible by n bits address). To a human programmer, the division is invisible and thus it can also be said that the memory 2 is "logically" divided into two memories 2A and 2B.

Simultaneously to supplying an address to address generator 42, DSP 3 sends a command to address generator 42 indicating whether the address generated in addition to the address supplied is to be +n greater in magnitude or −n lesser in magnitude, where n is an odd number, than the address supplied. Thus, the address generated can be any address as long as it is of opposite polarity (odd or even) to the address supplied by the DSP 3.

Additionally, by way of example, DSP 3 may supply each of a read command, a write command and a double word command to a read/write command generator 48. The combination of read command, write command and double word command determines whether one or both of supplied address and generated address are written into or read from even memory 2A and odd memory 2B. Read/write command generator 48 either prevents or allows access into either of memory 2A or 2B depending on whether the address supplied by the DSP is odd or even, whether a double word is required and whether the double word should be written or read into the even memory 2A or the odd memory 2B. This is achieved by generating a read/write command 49 to odd memory 2B and/or a read/write command 50 to even memory 2A as is appropriate. Thus, although address generator 42 always generates 2 addresses, DSP 3 controls whether they are written into or read from memories 2.

Reference is now made to FIG. 4 which shows, by way of example, the internal architecture of read/write command generator 48. Only the "read" portion of generator 48 is shown, but the "write" portion is similar. The read logic units for odd and even memories 2B and 2A are designated 51 and 52 respectively. Logic units 51 and 52 are respectively made up of "AND" gates 53 and 54 and "AND" gates 57 and 60 connected to "OR" gates 55 and 61 respectively. Inverter 56, for logic unit 51 and inverters 58 and 59 for logic unit 52 are suitably placed in read, double word and address inputs to "AND" gates 53,54 and 57,60 respectively. For unit 51 (read odd), the read signal is supplied through one input to "AND" gate 53 whilst the double word signal (if present) is supplied to another input of "AND" gate 53. The read signal is also supplied to "AND" gate 54 and the double word signal is supplied to "AND" gate 54 via an inverter. "AND" gate 54 also receives the LSB of the supplied address $I_0$. Unit 52 (read even) is similarly configured to unit 51 except that the input of the LSB of the supplied address is first inverted by an inverter.

Looking at unit 51 which produces the read-odd instruction it can be seen that when the LSB, $I_0$ [0] of the address supplied is 1 (i.e odd supplied address) and a double word instruction accompanied by a read instruction is given, "AND" gate 54 produces a zero and "AND" gate 53 produces a 1. The resulting output of "OR" gate 55 is a 1 which causes the odd address to be read from the memory. For the same input conditions unit 52 produces a 1 which causes the even address to also be read. Thus, for these input conditions both addresses are read. A similar result is obtained when a double word read command and even LSB (i.e even supplied address) (zero) are the input conditions. When the input conditions are an odd LSB (i.e odd supplied address) (one) with no double word selected and a read command, the logic circuits of unit 52 produce a zero output and those of unit 51 produce a 1 (or read) output. Similarly, when the input conditions are an even LSB (i.e even supplied address), unit 52 produces a 1 (or read) output and unit 51 produces a zero output.

The effect of the arrangement of unit 51 is that the odd memory 2B will be read when the address supplied is odd and a read command is given or when the address supplied is even and a double (second) word is generated with a read command. Similarly, unit 52 causes even memory 2A to be read when the address supplied is even and a read command is given or when the address supplied is odd and a double (second) word command and a read command are given.

Thus, which of the two addresses generated by address generator 42 is read from or written to even and odd memories 2A and 2B is controlled by DSP 3, through read/write command generator 48.

FIG. 5, which is now referred to herein, shows the address generation unit 42 in detail. Similar items to those shown in previous figures are similarly numbered and will not be described further. Address generation unit 42 comprises an adder 70 for generating an address which is either +X or −X, (where X is an odd number) from the address supplied, $I_0$ by DSP 3, a multiplexer 72 for routing an even address, address_even to the EVEN_MEM 2A and a multiplexer 74 for routing an odd address, address_odd to the ODD_MEM 2B. An address $I_1$ which is a distance +1 or −1 from the address supplied may also be generated by an incrementor/decrementor (not shown). The generated address, $I_1$, is supplied to both the multiplexers 72 and 74. Mux 72 selects the one of $I_1$ and $I_0$ which is even, while mux 74 selects the one which is odd.

Figure 6A:
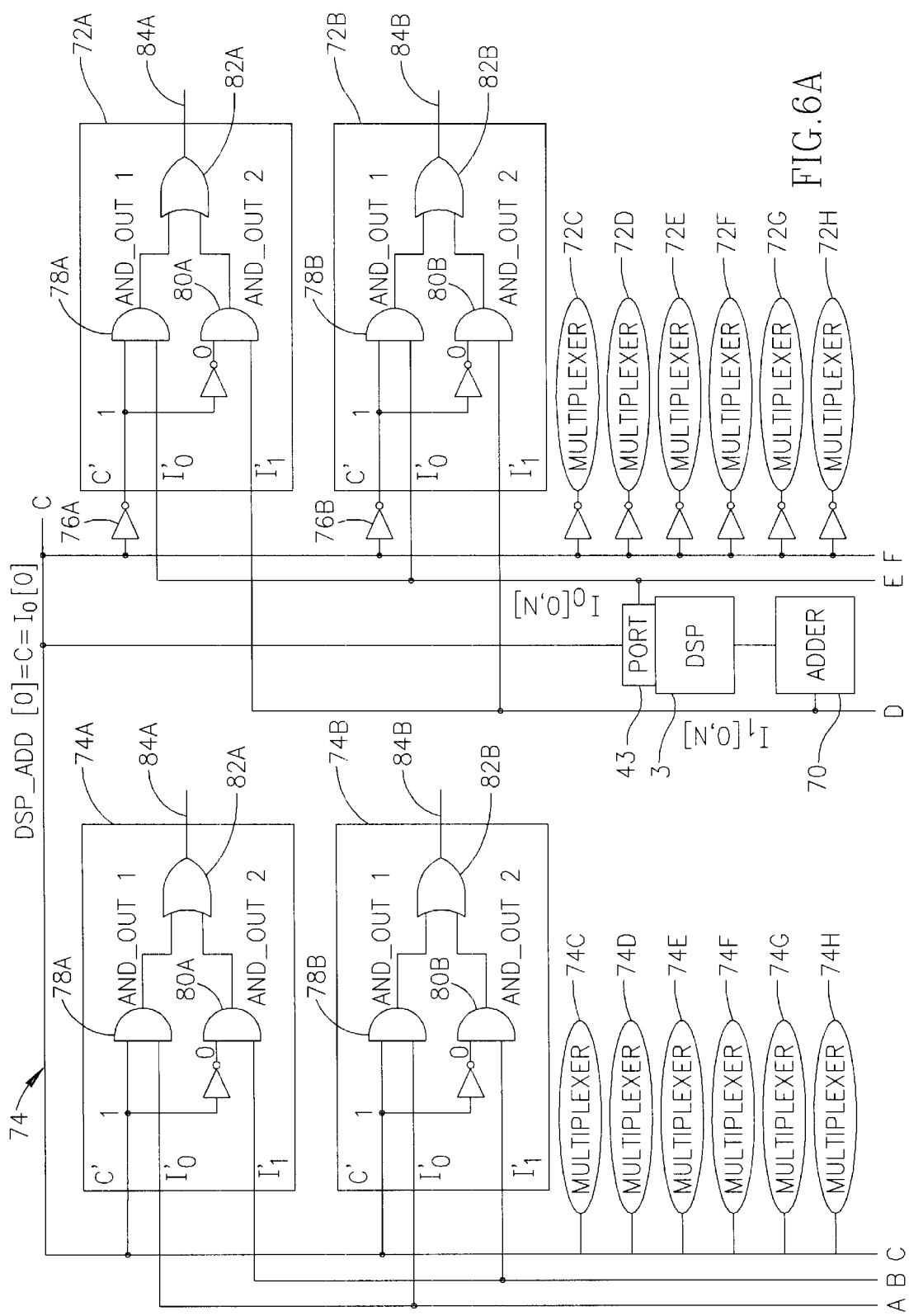
FIGS. 6A and 6B illustrate the multiplexers of the address generation unit configured in accordance with a preferred embodiment of the present invention.
Figure 6B:
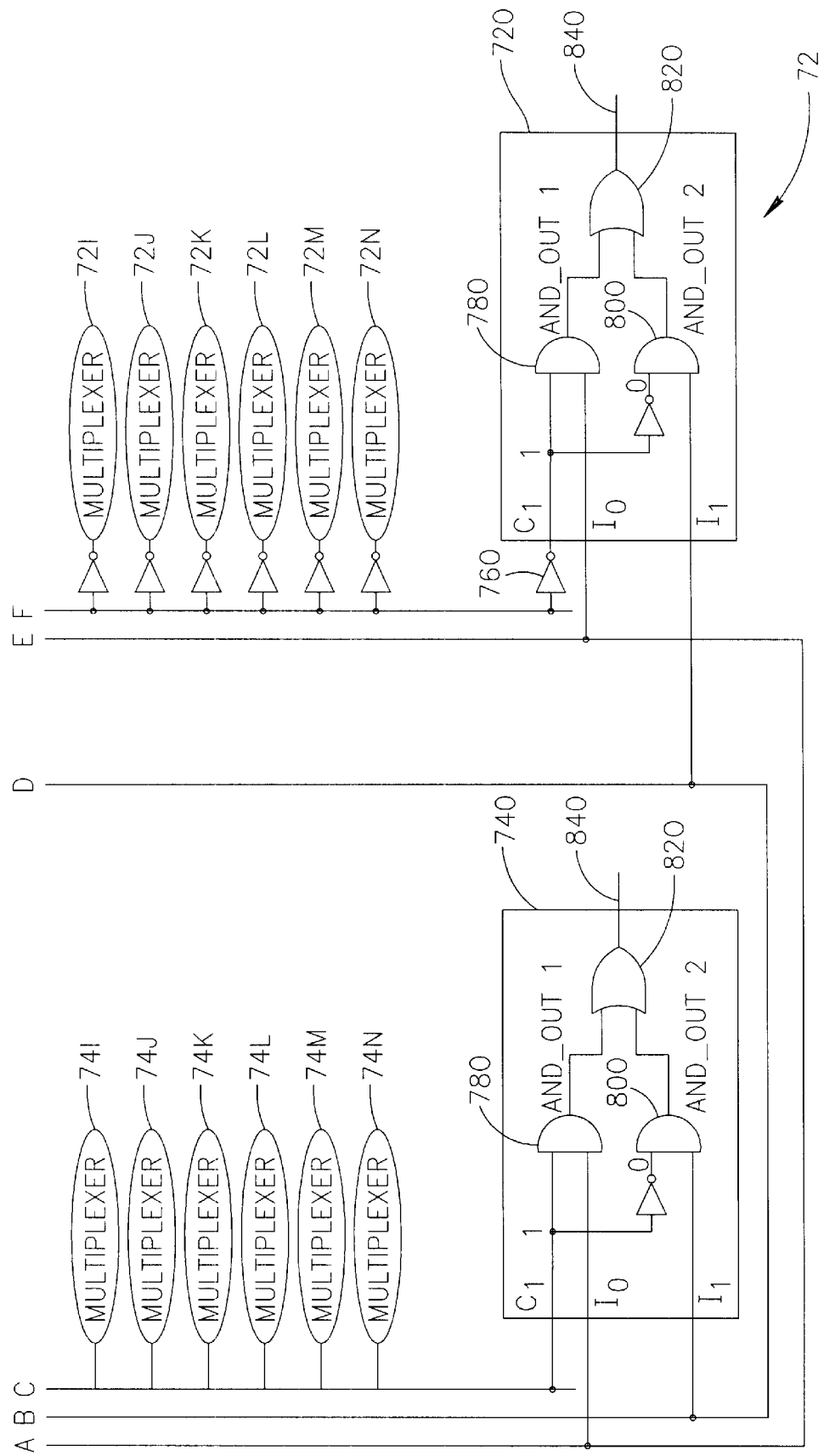
Figure 7A:
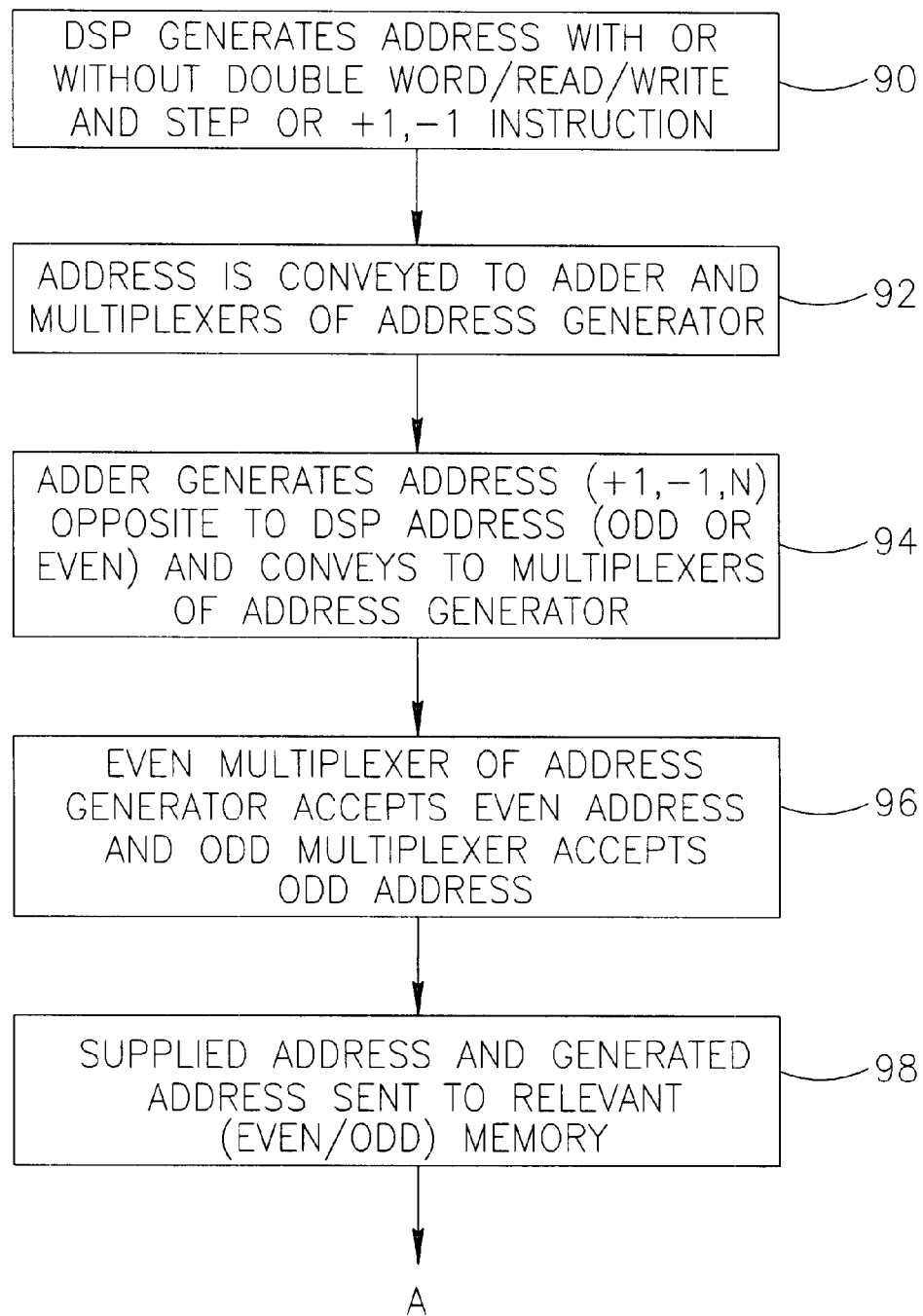
FIG. 7 is a flow chart illustration of the steps which occur in the generation and sorting process leading to the generation of two addresses.
Figure 7B:
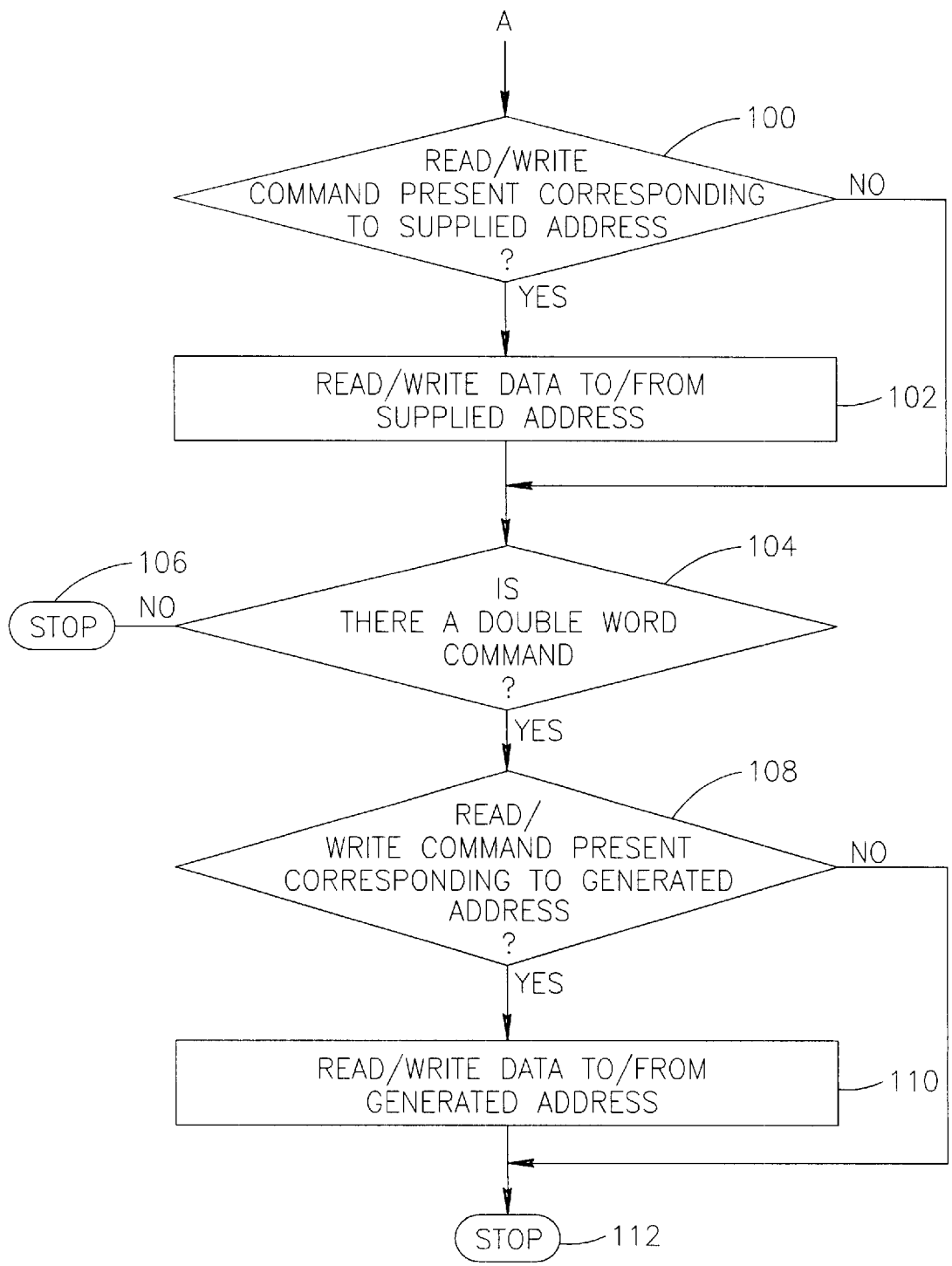

Reference is now made to FIGS. 6A, 6B and FIG. 7. FIGS. 6A and 6B show a more detailed exemplary illustration of multiplexers 72 and 74 in operation in accordance with an embodiment of the present invention. FIG. 7 is a flow chart illustration of the steps which occur in the generation and sorting process leading to the generation of an odd and an even address from the address supplied by DSP 3 in accordance with an exemplary operation of system 40.

The structure of multiplexer 72 and the structure of multiplexer 74, which are complementary, will now be described (FIG. 6). Each respective multiplexer 72 and 74 contains, by way of example only, 15 elements, 72A–72O and 74A–74O respectively. Thus, each unit 72A–72O and 74A–74O processes a single bit of the 15 bit address of the present example. The number of bits in the address may vary in different situations. Units 72 and 74 are identical in structure. Units 72 and 74 route each bit of the address supplied and any generated address to the odd memory 2B or the even memory 2A, whichever is the correct one as is described hereinabove with reference to FIG. 5. Units 72A–72O each comprise two "AND" gates 78 and 80 whose outputs AND_OUT1 and AND_OUT2 respectively connect to an "OR" gate 82. The output of "OR" gate 82 is designated 84. "AND" gate 78 has two inputs, the first of which is connected to the first input of "AND" gate 80 via an inverter. "AND" gate 80 also has a second input. For unit 72 the first input to "AND" gate 78 has an inverter 76 connected to it whereas for unit 74, the first input to "AND" gate 78 does not have an inverter.

A single bit of the supplied address $I_0$, is designated $I_0'$, whereas a bit of a generated address $I_1$ is designated $I_1'$. The parameter C, which is the Least Significant Bit (LSB) of the generated address (and so determines whether it is an odd or an even address), is fed via inverter 76A (after which it is designated C') to "AND" gate 78A of unit 72A of multiplexer 72. The other input of "AND" gate 78A receives the relevant bit, $I_0'$ of initially supplied address (designated by $I_0$). One input of a second "AND" gate 80A receives the inverted value of C' (i.e of C, the LSB of the supplied address, which determines whether it is odd or even) and another input of second "AND" gate 80A is fed $I_1'$, the relevant bit of the generated address generated by adder 70.

The outputs of "AND" gates 78A and 80A are linked to an "OR" gate 82A whose output is sent to the odd or even address.

The effect of the arrangement 72A described hereinabove is that when C' is 1 i.e. when C is even (0) (i.e when there is an even address), the value of $I_0'$ appears at the output 84A. Thus, when the address supplied is even, each bit $I_0'$ of the supplied even address appears at the outputs 84A–84O of units 72A–72O of multiplexer 72. When the supplied address, represented by $I_0$, is supplied to the even memory 2A, via multiplexer 72, the value C (its LSB or $I_0'$) is even (zero) and it appears at the first input of "AND" gate 78A of unit 74A (for example) uninverted (there is no inverter inverting the inputted C of multiplexer 74). This results in the value which appears at the second input of "AND" gate 80A, $I_1'$ (the relevant 'bit' of the generated address) appearing at the output 84A of unit 74A of multiplexer 74. Thus, when the supplied address is even, multiplexer 72 transmits it to even memory 2A and the generated address (which, in this example, will always be odd and represented by $I_1$) is transmitted via multiplexer 74 to odd memory 2B. The converse occurs if the supplied address is odd (i.e the LSB, C is 1), that is, the supplied odd address is routed to odd memory 2B via multiplexer 74 and an even generated address, $I_1$ is routed to even memory 2A via multiplexer 72. Thus, whether the supplied address is even or odd and the generated address is even or odd respectively, the even one is routed to even memory 2A via multiplexer 72 and the odd one is routed to odd memory 2B via multiplexer 74. There are always two addresses exiting multiplexers 72 and 74 no matter whether two words (double word) or a single word are ultimately required from the memory.

Turning to FIG. 7, at step 90 DSP 3 supplies an address with or without double word command, read command, write command and step (N), +1, −1 instruction. At step 92, the supplied address is conveyed to adder 70 and multiplexers 72 and 74 of address generator 42. Adder 70 generates a generated address which is +1, −1 or N (odd number) away from supplied address and conveys it to multiplexers 72 and 74 of address generator 42 (step 94). At step 96, even multiplexer 72 accepts the even address and odd multiplexer 74 accepts the odd address. At step 98, the supplied address (whether it is odd or even) is sent to even memory 2A or odd memory 2B, whichever is appropriate, and the generated address (whether it is odd or even) is sent to even memory 2A or odd memory 2B, whichever is appropriate. If a read/write command corresponding to the supplied address is present (step 100) the word 6 or data is read from or written to the supplied address (step 102). If there is no read/write command (step 100) then step 102 is omitted and step 104 is proceeded to. If a double word command was given (step 104) and a read/write command corresponding to the generated address is present (step 108) the word 6 or data corresponding to the generated address is respectively written/read to or from even memory 2A or odd memory 2B, as is appropriate. Otherwise, in the absence of either a double word command (step 104) or a subsequent read/write command (step 108) the process stops and no data is written or read.

Address generation unit 42 facilitates the generation of double addresses. Two equivalent standard memories half the size of the original memory replace the standard memory for a given size of memory required. Further, the double address facility obtained using address generation unit 42 allows the generation of two addresses stored in any part of the memory provided that they are complimentary (one is even and one is odd). CU's are, in general, configured to work with an odd and an even address so this requirement is not restrictive. The cost benefits of situating the double word generator outside the microchip are considerable in terms of area and overall simplicity.

It will be appreciated that the present invention is not limited by what has been described hereinabove and that numerous modifications, all of which fall within the scope of the present invention, exist. For example, all the components described may be contained within one another rather than be separate. Port 43 may, for example, be separate or contained within address generator 42. Likewise, address generator 42 may be contained within DSP 3. Memories 12A and 12B may similarly be contained within DSP 3. The above combinations are non-exhaustive and many more permutations exist.

It will be appreciated, by persons skilled in the art, that the present invention is not limited by what has been particularly shown and described hereinabove. Rather the scope of the invention is defined by the claims that follow:

What is claimed is:

1. An apparatus comprising:
    a port to receive an input address;
    at least one even unit in operative communication with said port to output an even address, wherein if said input address is even, said even address is equal to said input address and if said input address is odd said even address is spaced from said input address by N addresses, where N is an odd integer whose absolute value is greater than 1; and
    at least one odd unit in operative communication with said port to output an odd address, wherein if said input address is odd, said odd address is equal to said input address and if said input address is even said odd address is spaced from said input address by N addresses.

2. Apparatus according to claim 1, wherein said even address and said odd address refer to different rows of a memory.

3. An apparatus comprising:
    an even memory bank to store even addressed words;
    an odd memory bank to store odd addressed words; and
    an address generation unit to receive a first address and to generate a second address by adding or subtracting N from said first address, where N is an odd integer whose absolute value is greater than 1, such that one of said first address and said second address is odd and the other is even, and to provide said even address to said even memory bank and said odd address to said odd memory bank.

4. Apparatus according to claim 3 and further comprising a read/write command generator to generate a read-odd/write-odd command for said odd memory bank upon receipt of a read/write instruction when said first address is odd or upon receipt of said read/write instruction and a double word instruction when said first address is even and to generate a read-even/write-even command for said even memory bank upon receipt of said read/write instruction when said first address is even or upon receipt of said read/write instruction and said double word instruction when said first address is odd.

5. Apparatus according to claim 3, wherein said address generation unit comprises:
    an adder to add or subtract N from said first address to generate said second address;
    an even unit to receive said first address and said second address and to output the even one of said first address and second address to said even memory bank; and
    an odd unit to receive said first address and said second address and to output the odd one of said first address and said second address to said odd memory bank.

6. Apparatus according to claim 3, wherein the row of said even memory bank to which said even address refers is different from the row of said odd memory bank to which said odd address refers.

7. A method comprising:
    receiving a first address;
    generating a second address by adding or subtracting N from said first address, where N is an odd integer whose absolute value is greater than 1, such that one of said first address and said second address is odd and the other is even;
    providing the even one of said first address and said second address to an even memory bank and providing the odd one of said first address and said second address to an odd memory bank.

8. The method of claim 7, wherein the row of said even memory bank to which the even one of said first address and said second address refers is different from the row of said odd memory bank to which the odd one of said first address and said second address refers.

9. An apparatus comprising:
    an adder to add or subtract an odd integer whose absolute value is greater than 1 from a first address to generate a second address;
    an even unit to receive said first address and said second address and to output the even one of said first address and second address; and
    an odd unit to receive said first address and said second address and to output the odd one of said first address and said second address.

10. Apparatus according to claim 9, wherein said even unit comprises Q sub-units each comprising two AND gates and an OR gate, wherein output of each of said AND gates is input to said OR gate, and wherein Q is the length of said first address.

11. Apparatus according to claim 9, wherein the even one of said first address and said second address and the odd one of said first address and said second address refer to different rows of a memory.

12. Apparatus comprising:
    means for substantially simultaneously reading two non-aligned words from a memory, one of said words having an even address and the other of said words having an odd address that is separated from said even address by an odd integer whose absolute value is greater than 1; and
    a digital signal processor to input only one of said even address and said odd address to said means.

* * * * *